United States Patent
Erkes et al.

(10) Patent No.: US 7,871,593 B2
(45) Date of Patent: Jan. 18, 2011

(54) PROCESS AND APPARATUS FOR THE CATALYTIC OXIDATION OF $SO_2$-CONTAINING GASES BY MEANS OF OXYGEN

(75) Inventors: Bernd Erkes, Brüggen (DE); Martin Kürten, Bergisch Gladbach (DE); Verena Haverkamp, Bergisch Gladbach (DE)

(73) Assignee: Bayer Technology Services GmbH, Leverkusen (DE)

( * ) Notice: Subject to any disclaimer, the term of this patent is extended or adjusted under 35 U.S.C. 154(b) by 0 days.

(21) Appl. No.: 12/447,957

(22) PCT Filed: Oct. 13, 2007

(86) PCT No.: PCT/EP2007/008910
§ 371 (c)(1),
(2), (4) Date: Jul. 28, 2009

(87) PCT Pub. No.: WO2008/052649
PCT Pub. Date: May 8, 2008

(65) Prior Publication Data
US 2010/0092374 A1  Apr. 15, 2010

(30) Foreign Application Priority Data
Oct. 31, 2006  (DE) .................. 10 2006 051 899

(51) Int. Cl.
*B01J 7/00* (2006.01)
*B01J 12/00* (2006.01)
*C01B 17/69* (2006.01)

(52) U.S. Cl. .................. 423/532; 423/533; 422/129; 422/160; 422/198; 422/200; 422/211

(58) Field of Classification Search .................. 423/532, 423/533; 422/129, 160, 211, 198, 200
See application file for complete search history.

(56) References Cited

U.S. PATENT DOCUMENTS

| | | | |
|---|---|---|---|
| 5,387,402 A | 2/1995 | Tacke et al. | |
| 5,624,653 A | 4/1997 | Grozev et al. | |
| 2006/0245997 A1 | 11/2006 | Daum et al. | |
| 2009/0258259 A1* | 10/2009 | Leshchiner et al. | 429/17 |

FOREIGN PATENT DOCUMENTS

| | | |
|---|---|---|
| DE | 20 26 816 | 10/1972 |
| DE | 195 31 630 | 3/1996 |
| DE | 102 49 782 | 5/2004 |
| EP | 0 572 053 | 12/1993 |
| EP | 0 715 886 | 6/1996 |
| GB | 1 504 725 | 3/1978 |

* cited by examiner

*Primary Examiner*—Timothy C Vanoy
(74) *Attorney, Agent, or Firm*—Norris McLaughlin & Marcus, P.A.

(57) ABSTRACT

Process for the continuous catalytic complete or partial oxidation of a starting gas containing from 0.1 to 66% by volume of sulphur dioxide plus oxygen, in which the catalyst is kept active by means of pseudoisothermal process conditions with introduction or removal of energy; apparatus for the continuous catalytic complete or partial oxidation of a starting gas containing sulphur dioxide and oxygen having at least one tube contact apparatus in the form of an upright heat exchanger composed of at least one double-walled tube whose catalyst-filled inner tube forms a reaction tube, with heat being transferred in cocurrent around the reaction tube and an absorber for separating off $SO_3$ downstream of the tube contact apparatus; the reactivity of the catalyst being preset by mixing with inert material.

16 Claims, 5 Drawing Sheets

Fig. 1: Prior art

PROCESS AND APPARATUS FOR THE CATALYTIC OXIDATION OF SO$_2$-CONTAINING GASES BY MEANS OF OXYGEN

This is a 371 of PCT/2007/008910 filed Oct. 13, 2007 (international filing date), which claims foreign priority benefit under 35 U.S.C. §119 of German Patent Application No. 10 2006 051 899.3 filed Oct. 31, 2006.

The invention relates to a process and an apparatus for the catalytic oxidation of gases containing 0.1-66% by volume of SO$_2$ by means of oxygen in a pseudoisothermally operated tube contact apparatus (PIC) with indirect cooling or heating to maintain the desired operating temperature of the catalyst.

BACKGROUND OF THE INVENTION

In the prior art, sulphuric acid is usually prepared on an industrial scale by the double contact process in a reactor having one or more catalyst-containing contact stages (as described, for example, in Ullmanns Encyclopedia of Industrial Chemistry). The oxidation SO$_2$ +½O$_2$→SO$_3$ usually occurs catalytically, e.g. over a vanadium pentoxide catalyst with or without cesium in a temperature window of T=380° C.-650° C. Furthermore, it is known that at T<340° C.-380° C. the catalyst does not reach the required ignition temperature and that it is irreversibly damaged at T>630° C.-650° C. It is also known that at an SO$_2$ content of above 13.5% by volume the reaction in a classical contact stage is so exothermic that the catalyst forms hot spots and is irreversibly damaged. To meet the requirements of the catalyst, plants corresponding to the prior art are therefore operated at T<640° C. and SO$_2$ contents of <13.5% by volume in the starting gas to avoid irreversible damage to the catalyst. In addition, to ensure that the catalyst starts working in a process carried out adiabatically according to the prior art, the starting gas inlet temperature has to be T>380° C. and the SO$_2$ contents have to be > about 5% by volume.

For the catalytic oxidation of starting gases having an SO$_2$ content of >13.5% by volume, it has been proposed, for example, that the starting gas firstly be diluted with air before introduction to the catalyst and that correspondingly greater gas volumes be passed through the plant. Particularly when using pyrometallurgical offgases as sulphur dioxide-rich starting gases having SO$_2$ contents of 20-66% by volume, a large dilution factor would be necessary, resulting in disproportionately high costs.

DE-A 2026818 (corresponding to U.S. Pat. No. 3,755,549) describes a process in which the starting gases are diluted with SO$_3$ driven off from oleum and additional dilution air to an SO$_2$ concentration of 10-20% by weight before entering the first contact stage. Disadvantages are the high costs and the low specific SO$_2$ conversion in the first contact stage.

DE-10249782 (corresponding to US 2006/245,997) describes a process for preparing sulphuric acid on the basis of concentrated starting gases having an SO$_2$ concentration of >13.5% by volume in a reactor having a plurality of contact stages, which can be operated using relatively small amounts of dilution air. The dilution in the first contact stage is achieved by recirculation of a partially oxidised gas stream. A substream of the SO$_2$/SO$_3$-containing gas is taken off from a contact stage preceding the last main contact stage. This substream is mixed with the starting gas (SO$_2$ content of more than 13% by volume) to form a contact gas which has an SO$_2$ content of <13% by volume to reliably avoid overheating of the catalyst and can be fed to the first contact stage. Here, the thermodynamic equilibrium of the reaction SO$_2$+½O$_2$<=>SO$_3$ is shifted in the direction of the starting materials, thus avoiding overheating of the catalyst. A disadvantage of this process is the high outlay in terms of apparatus.

Particularly in metallurgical processes and the resulting offgasses but also for increasing the capacity of existing sulphuric acid plants using sulphur combustion, it is necessary to have economical processes for the treatment of starting gases having SO$_2$ concentrations of >13.5% by volume while maintaining the volume flows and thus the hydraulics.

In many chemical processes in which sulphur compounds are used, an economical and ecological process for the treatment of starting gases having an SO$_2$ content of <5% by volume even with strongly fluctuating concentrations is also required.

It is therefore an object of the invention firstly to make possible the inexpensive preparation of sulphuric acid for concentrated starting gases having sulphur dioxide contents of >13.5% by volume and secondly to provide an economically ecological process for sulphur dioxide-containing offgases (SO$_2$<5% by volume) from various chemical processes.

SUMMARY OF THE INVENTION

According to the present invention, the object is achieved by pseudoisothermal process conditions with introduction or removal of energy, preferably via an intermediate circuit and preferably in a tube contact apparatus. In the case of starting gases having an SO$_2$ content of > about 5% by volume, the heat of reaction evolved is removed continuously via an intermediate circuit so that pseudoisothermal process conditions are established over the catalyst, when using a vanadium pentoxide catalyst with or without cesium preferably in a temperature window of T=420° C.-600° C., and in the case of starting gases having an SO$_2$ content of < about 5% by volume heat can be introduced continuously via the intermediate circuit so that pseudoisothermal process conditions over the catalyst are likewise established, when using a vanadium pentoxide catalyst preferably in a temperature window of T=420° C. to 600° C.

The process of the invention surprisingly makes it possible to convert starting gases having an SO$_2$ content in the range 0.1<SO$_2$<66% by volume at least partly into sulphur trioxide by oxidation by means of oxygen over a catalyst.

The present invention therefore provides a process for the continuous catalytic, complete or partial oxidation of a starting gas containing sulphur dioxide and oxygen, characterized in that the catalyst is kept active by means of pseudoisothermal process conditions with introduction or removal of energy.

The present invention further provides an apparatus for the continuous catalytic, complete or partial oxidation of a starting gas containing sulphur dioxide and oxygen, characterized by at least one tube contact apparatus which is an upright heat exchanger comprising at least one double-walled tube whose catalyst-filled interior tube forms a reaction tube, where the heat is transferred around the reaction tube by means of a cooling medium and the tube contact apparatus can be followed by an absorber for separating off SO$_3$.

DETAILED DESCRIPTION

The tube contact apparatus is preferably an upright heat exchanger comprising a plurality of double-walled tubes which have an interior tube and an outer tube, with a catalyst being present in the interior tubes and heat transfer being effected around these interior tubes/reaction tubes by means of a cooling medium which is conveyed in cocurrent through the intermediate space between interior and outer tubes.

The process of the invention is preferably carried out in one of the embodiments of the apparatus of the invention. The process of the invention is preferably carried out in a tube contact apparatus. The introduction or removal of energy is preferably effected via an intermediate circuit.

In the process of the invention, the temperature window and in particular temperature maximum established is laid down within fixed limits in respect of the sulphur dioxide concentration essentially in the design phase. Significant parameters are gas inlet temperature, gas velocity, catalyst dilution, tube geometry and cooling power.

The conditions in the intermediate circuit are usually set so that the catalyst does not exceed the damaging limit value of 640° C. at any point when using a vanadium pentoxide catalyst with or without cesium. The conditions are preferably set so that the temperature profile established over the length of the tube is such that the inlet temperature is from 380° C. to 450° C., preferably from 400° C. to 450° C., the outlet temperature is in the range 430° C.-500° C. and the temperature maximum is not more than 580° C.

In a preferred embodiment of the process of the invention, a cesium-doped vanadium pentoxide catalyst containing 5-10%, preferably 6-8%, particularly preferably 7.5%, of cesium is used for low gas inlet temperatures of 360-450° C., preferably 370-450° C., particularly preferably 380-450° C.

The tube contact apparatus preferably has reaction tubes having a nominal diameter of from 25 mm to 150 mm, preferably from 50 mm to 80 mm, at tube lengths of from 1 m to 12 m, preferably from 2 m to 6 m.

The catalyst usually comprises a catalytically active metal or metal derivative, if appropriate together with promoters, applied to a catalyst support material. For example, the catalyst is $V_2O_5$ together with potassium and sodium salts applied to $SiO_2$.

To improve the temperature profile over the bed height of the catalyst, the catalyst is, in a particular embodiment of the process, mixed with a heat-resistant inert material, in particular the pure catalyst support material such as glass, $SiO_2$, $Al_2O_3$ or other customary oxides, ceramic, silica gel or zeolites, preferably glass and ceramic.

The reactivity of the catalyst used is usually preset by mixing with the inert material in a ratio of from 1:100 to 100:1. Preference is given to mixing inert material and catalyst in ratios of from 90:10 to 40:60, particularly preferably from 80:20 to 40:60.

Depending on the $SO_2$ concentration of the starting gases, heat is removed or introduced continuously around the reaction tubes.

Since a temperature maximum is established over the length of the tubes as a function of the amount of gas, gas inlet temperature, $SO_2$ concentration at the inlet, the apparatus design such as tube length, tube diameter, degree of dilution of the catalyst, flow into the tube because of the kinetics, heat removal is of particular importance.

The cooling medium can be conveyed in cross-current, countercurrent or cocurrent. Owing to the exothermic reaction, cocurrent operation is preferred. This offers considerable advantages in respect of reliable avoidance of local temperature peaks over the catalyst and in respect of the mass flow of the cooling medium which is to be circulated.

Possible cooling media for the indirect introduction and/or removal of heat via the intermediate circuits are, in principle, heat-transfer oils, salt solutions, steam, gases and air. For cost reasons, air is preferred as medium. When air is used as preferred cooling medium, the double-walled construction is selected so that a heat transfer number (alpha values) of from 20 to 80 W/m²K, preferably from 40 to 70 W/m²K, is established as a result of the operating properties and tube pairings (interior tube and outer tube) chosen.

In a particular embodiment of the apparatus of the invention, the temperature in the tube contact apparatus is set by means of an indirectly operated cooling and/or heating circuit comprising a cooler, blower or pump and/or heater.

The heat to be removed from the cooling circuit in the temperature range from about 220° C. to 550° C., preferably from 300° C. to 450° C., can be passed to a further operational use via a heat exchanger, preferably as low-pressure steam.

In an embodiment of the apparatus of the invention, a plurality of tube contact apparatuses are connected in series or in parallel.

In further embodiments, the apparatus has, downstream of the tube contact apparatus:
- optionally one or two preabsorbers (oleum/intermediate absorbers),
- one or more contact stages, optionally with an oleum/intermediate absorber,
- a final absorber and
- optionally an offgas purification plant.

The tube contact apparatus can be combined with a classical contact plant, preferably with a double contact plant and at least one oleum/intermediate absorber, a contact stage and a final absorber. In this case, the tube contact apparatus is installed upstream of the classical double contact plant. In the case of a very high inlet concentration of sulphur dioxide, a preabsorber is preferably installed downstream of the tube contact apparatus. The preabsorber, oleum/intermediate absorber and final absorber take the $SO_3$ produced from the gas stream. The gases, whose sulphur dioxide inlet concentrations have been reduced to 5-13% by volume by means of the process of the invention, can be treated further in the downstream double contact plant according to the prior art.

If tube contact apparatus and a classical contact plant comprising one or more contact stages are coupled, it is useful for the catalyst in the tube contact apparatus to have the same chemical composition as that in the contact stages of the contact plant.

According to the invention, the process can be realised according to different concepts depending on the $SO_2$ inlet concentration in the starting gas employed and on the type of plant required, i.e. new plant or retrofitting of an existing plant.

In the case of starting gases containing up to 5% by volume of sulphur dioxide, a temperature of the vanadium pentoxide catalyst with or without cesium of 450° C. to 580° C., which is advantageous for the reaction, can, if necessary, be maintained by continuous introduction of heat via the indirect heating circuit. The sulphur trioxide is separated off from the $SO_3$ in a final absorber according to the prior art. The unreacted proportion of sulphur dioxide can be purified to the required legal emission limits in a final gas scrub, e.g. catalytically over wet activated carbon or another customary method.

In the case of starting gases containing less than 5% by volume of sulphur dioxide, the process of the invention makes it possible to process sulphur dioxide in a pseudoisothermally operated tube contact apparatus by oxidation to sulphur trioxide using, for example, conventional vanadium pentoxide catalysts with or without cesium at a high conversion (>90%) in one apparatus, at the same time with high flexibility in respect of the inlet concentrations of sulphur dioxide. A further great advantage of the process of the invention is its environment friendliness. When a suitable final gas purification method is used, virtually 100% of the $SO_2$ can be converted into sulphuric acid.

In the case of starting gases having a sulphur dioxide concentration of greater than 5% by volume, the catalyst can be maintained at a temperature of from 420° C. to 600° C. which is advantageous for the reaction by continuous removal of heat via the indirect cooling circuit. Compared to conventional methods, dilution gases are no longer used even above the 13.5% by volume of $SO_2$ limit. Overheating of the catalyst is reliably avoided over all operating states by appropriate dimensioning of the tube contact apparatus with sufficient cooling power and dilution of the catalyst with inert material. A further advantage compared to conventional processes is therefore that correspondingly greater amounts of sulphuric acid can be generated at unchanged volume flows through the total contact plant or the capacity of the upstream production plant can be increased.

In the case of starting gases containing more than 5% by volume of sulphur dioxide, the process of the invention makes it possible, by means of the pseudoisothermally operated tube contact apparatus, to process sulphur dioxide by oxidation to sulphur trioxide using, for example, conventional vanadium pentoxide catalysts with or without cesium at a high conversion (>90%) in one apparatus, with the advantage of high flexibility in respect of the inlet concentrations of sulphur dioxide.

A further advantage of the process of the invention is obtained when the capacity of an existing plant operating by the double contact process is to be increased in respect of the sulphur dioxide conversion by increasing the $SO_2$ inlet concentration to significantly above 13.5% by volume.

In a particular embodiment of the process, a substream can be treated by upstream installation of a pseudoisothermally operated tube contact apparatus so that an $SO_2$ concentration of less than 13% by volume of $SO_2$ is obtained after the two substreams are recombined (bypass arrangement, FIG. 2). The gas pretreated by the process of the invention can then successfully be treated further in the classical double contact plant.

In a further embodiment of the process, a tube contact apparatus can be installed in series (i.e. without bypass, for example as in FIG. 3) upstream of a conventional double contact plant.

Contact gases having a sulphur dioxide content of from 13.5 to 30% by volume, preferably from 15 to 25% by volume, can usually be fed to the tube contact apparatus. If higher $SO_2$ inlet concentrations, for example from 30 to 66% by volume, are to be processed in the tube contact apparatus, air and/or technical-grade oxygen is preferably added to the feed stream as a function of the gas composition at the inlet. The ratio of $O_2$ to $SO_2$ in the contact gas is usually from 0.5 to 1.2 and more preferably from 0.7 to 0.9.

If the tube contact apparatus is installed upstream of a classical double contact plant, the process is carried out with the $SO_2$ concentration of the gases leaving the apparatus being set by regulation of the cooling circuit so that the conditions of the downstream main contact stages ($SO_2$ concentration of <13% by volume) are fulfilled. The gases are preferably at least partly freed of sulphur trioxide in a preabsorber according to the prior art before they are fed into the first main contact stage for further oxidation of the sulphur dioxide. In this mode of operation, the main contacts are usually operated as in the conventional processes. A conventional plant can in this way be improved to form a flexible production plant having an increased capacity and a low capital investment.

The process of the invention makes possible the direct production of 35% oleum and 65% oleum with elimination of a distillation stage and, by partial condensation, the production of 100% oleum.

The invention will be illustrated with the aid of examples and associated in-principle flow diagrams. The invention encompasses all descriptions and/or details shown pictorially, without being restricted thereto.

LIST OF REFERENCE SYMBOLS

Figure 1:
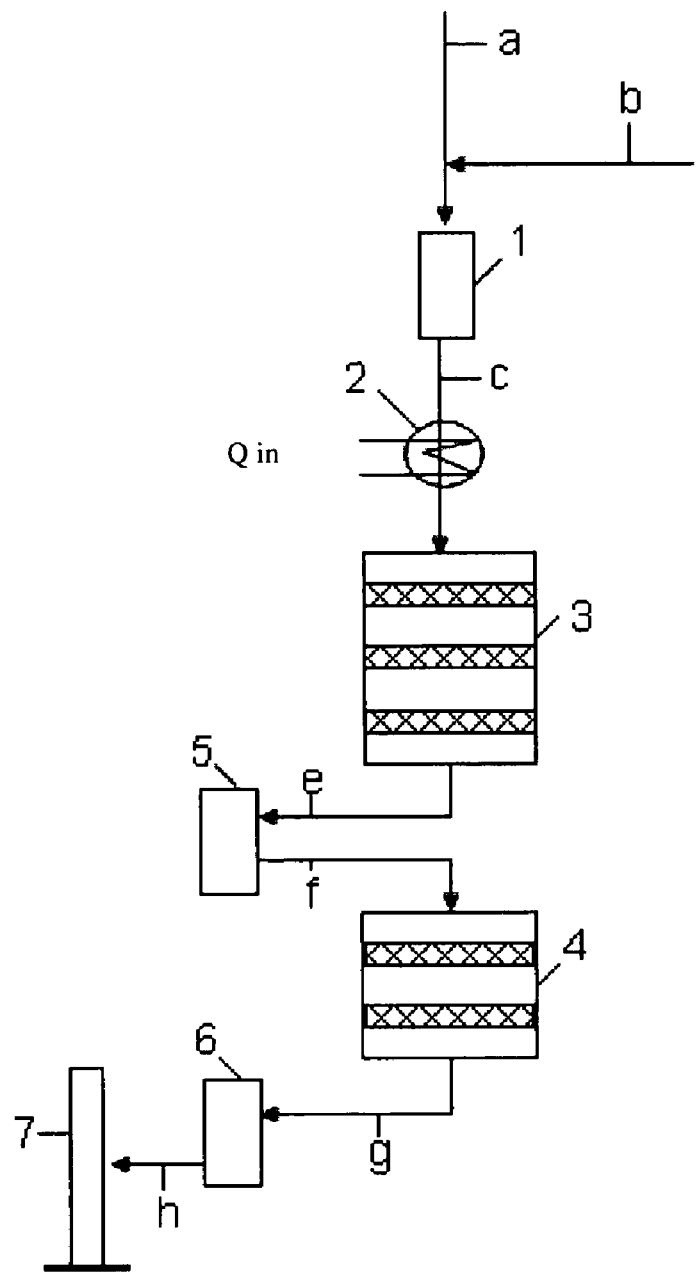
FIG. 1 shows the scheme of a process according to the prior art, in which a gas containing from 5 to 13% by volume of $SO_2$ is processed by means of a first main contact stage, intermediate absorption, second main contact stage and subsequent final absorption and discharged via a stack.

1 Gas drier
2 Gas preheater
3 First main contact
4 Second main contact
5 Oleum/intermediate absorber
6 Final absorber
7 Stack
8 Tube contact apparatus (pseudoisothermally operated—PIC)
9 Heater
10 Cooler
11 Blower/pump
12 Regulating flap
13 Preabsorber
14 Waste air scrubber
a Gas line at beginning of process
b Dilution air line
c Gas line to first main contact
d Oxygen (technical-grade) line
e Gas line to oleum/intermediate absorber
f Gas line to second main contact
g Gas line to final absorber h Gas line to stack
i Gas line to tube contact apparatus
j Gas line to waste air scrubber
k Circulation line for cooling/heating
l Gas line to preabsorber
m Gas line from tube contact apparatus to mixing point
n Gas line bypassing tube contact apparatus to the mixing point FIG. 1 shows a plant operated by the double contact process for the preparation of sulphuric acid according to the prior art (see also Ullmann's Encyclopedia of Industrial Chemistry).

It comprises a gas drier 1, a gas preheater 2, a first main contact 3 having up to three catalysts trays, an oleum/intermediate absorber 5, a second main contact 4 having up to two catalyst trays and a final absorber 6.

The offgas is discharged into the environment via the stack 7.

The reaction of $SO_2 + \frac{1}{2}O_2$ to $SO_3$ over catalysts used, usually based on vanadium pentoxide with or without caesium, is exothermic so that heat exchangers (not shown in the figures) are arranged between the individual catalyst trays to cool the exiting process gases to an inlet temperature necessary for the next process stage.

Starting gas containing less than 13.5% by volume of $SO_2$ is brought to the plant via line a and is diluted with air introduced via line b to an $SO_2$ concentration of <13% by volume of $SO_2$ before entering the gas drier 1.

The dried gas mixture is subsequently preheated in the gas preheater 2 to the inlet temperature required for the first catalyst tray and fed via line c to the first main contact 3 in which the exothermic oxidation reaction proceeds in up to three successive catalyst trays with intermediate cooling. The outflowing gas is fed via line e to an oleum/intermediate absorber 5. Here, the major part of the sulphur trioxide formed in the first main contact 3 is absorbed together with the proportions of water in the pumped circuit of the oleum/intermediate absorber 5 to form sulphuric acid. The gas is subsequently conveyed via line f to the second main contact 4 in which the further exothermic oxidation reaction proceeds in up to two successive catalyst trays. The gas is subsequently fed via line g to the final absorber 6 in which the residual sulphur trioxide formed is absorbed to form sulphuric acid.

The offgas is conveyed via line h to the stack 7 and leaves the plant here. The sulphuric acid produced in the oleum/intermediate absorber 5 and final absorber 6 is discharged from the plant.

EXAMPLES

Example 1

Figure 2:
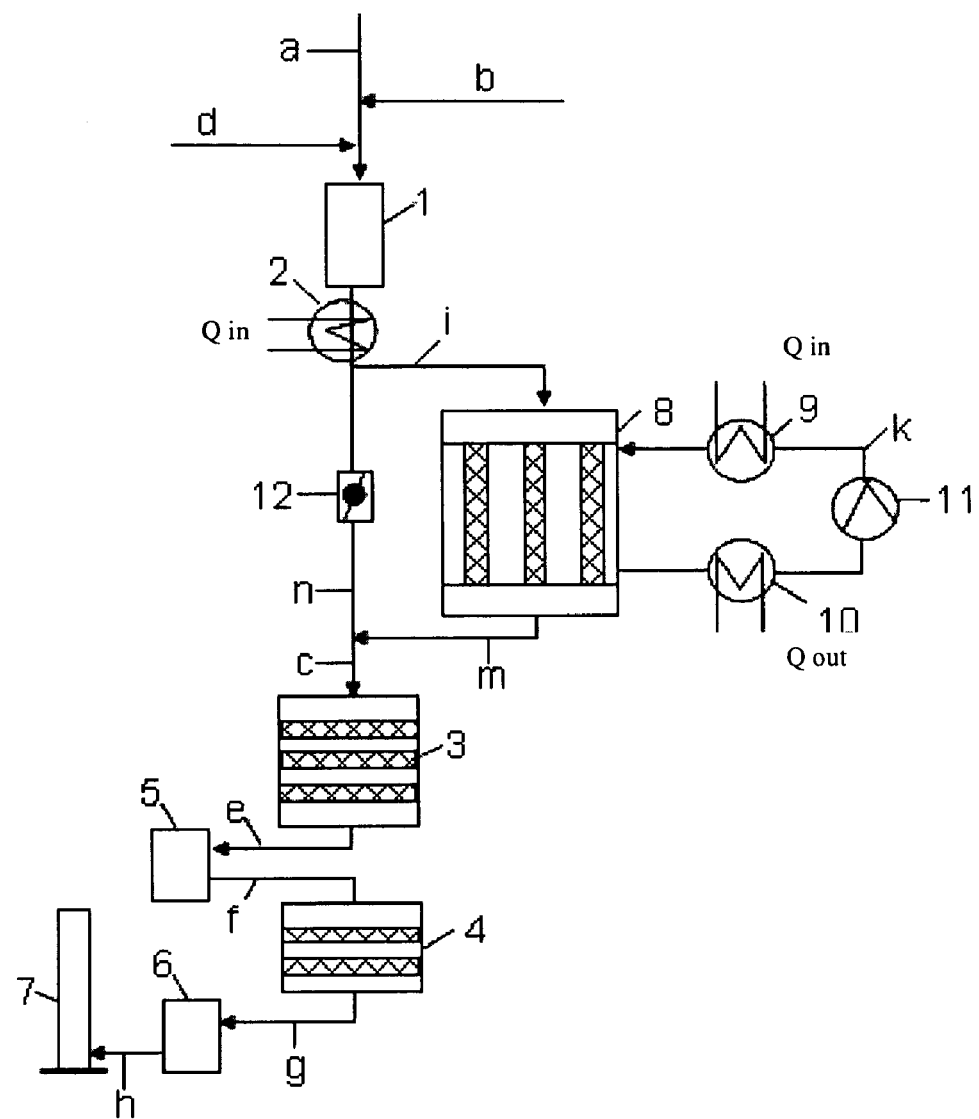
FIG. 2 shows a plant for carrying out the process of the invention in the case of a gas containing about 13-30% by volume of $SO_2$ by partial conversion in the tube contact apparatus and, if appropriate, subsequent preabsorption and also subsequent mixing with the residual gas to give a volume stream having an $SO_2$ mixed concentration of <13% by volume for subsequent processing of a residual gas in a main contact plant (Example 1).

FIG. 2 shows a first example of the process of the invention for the partial gas treatment of starting gases containing more than 13.5% by volume of sulphur dioxide by means of a bypass arrangement. In addition to the plant parts shown in FIG. 1, a gas divider downstream of a gas drier 1 is provided in this embodiment. A substream is conveyed through the tube contact apparatus (PIC) 8, while the remaining residual gas stream is regulated via the choke flap 12 to set the sulphur dioxide concentration to <13% by volume at the mixing point in the gas line c before entry into the first main contact 3. The tube contact apparatus (PIC) 8 is provided with an indirectly operated cooling and/or heating circuit comprising the cooler 10, blower or pump 11 and/or heater 9.

Starting gas containing from 13 to 30% by volume of $SO_2$, preferably from 15 to 25% by volume of $SO_2$ is supplied via line a and, if necessary, adjusted to the $SO_2/O_2$ ratio necessary for complete oxidation of the $SO_2$ to $SO_3$ by dilution with air supplied via line b or technical-grade oxygen supplied via line d before entering the gas drier 1.

The dried gas mixture is subsequently preheated in the gas preheater 2 to the required inlet temperature for the first catalyst tray of the main contact 3 and the tube contact apparatus (PIC) 8 and a substream is conveyed via line i to the tube contact apparatus (PIC) 8. The division of gas is set via the choke flap 12 so that the mixture of the gas leaving the tube contact apparatus (PIC) 8 via line m with the gases conveyed in bypass via line n achieves a sulphur dioxide concentration of <13% by volume at the mixing point in line c before these gases are fed to the first main contact stage 3. From here, the gas is processed further as described in FIG. 1 in the following plant parts according to the prior art.

The tube contact apparatus (PIC) 8 is equipped with an indirect cooling circuit 10 and/or heating circuit 11 and is operated so that an optimal temperature for the exothermic oxidation reaction is established over the catalyst. This is from about 420° C. to a maximum of 640° C. when a vanadium pentoxide catalyst is used. The conditions (volume flow, sulphur dioxide content and inlet temperature) at the inlet to the tube contact apparatus (PIC) 8 in line i are measured and the conditions in the cooling circuit are set so that the catalyst does not exceed the damaging limit value of 640° C. at any place. The conditions are preferably set so that the temperature profile established over the length of the tube is such that the inlet temperature is about 420° C., the outlet temperature is about 430° C. and the temperature maximum is not greater than 580° C.

Up to an inlet concentration of about 8% by volume of $SO_2$, the total amount of gas goes directly to the main contact 3 while the tube contact apparatus (PIC) 8 is in the warm state of readiness.

The heat to be removed from the cooling circuit operated in the range from about 220° C. to 550° C., preferably in the range from 350° C. to 450° C., is removed via the heat exchanger 10 and passed to a further operational use, preferably as low-pressure steam.

The heater in this example offers the advantage that in the start-up and transitional operating states with sulphur dioxide concentrations of <5% by volume in the exclusively bypass mode of operation with maintenance of a catalyst temperature of about 450° C., a conversion of significantly >92% is achieved and a significant improvement in environmental pollution is thus achieved for these operating states at very low cost. A further advantage of this example compared to the prior art as depicted in FIG. 1 is that at an unchanged gas volume flow, a more than 50% greater amount of sulphur dioxide can be processed to sulphuric acid with the advantageous consequence of being able to increase the capacity of the preceding process (for example metal production) by more than 50% in existing plants. At the same time, a significant improvement in environmental pollution can be achieved for start-up and transitional operating states. The outlay for retrofitting according to the invention comprises only the installation of the tube contact apparatus (PIC) 8 including the associated indirect cooling circuit. The costs for this are significantly below the comparable costs for a new plant according to the prior art having a comparable output.

A further advantage is the decrease in operating costs resulting from the larger amount of sulphuric acid produced and the passing-on of recovered thermal energy. A further advantage for retrofitting projects is the bypass arrangement.

The existing plant can at any time continue to be operated self-sufficiently and the installation time (reconnection) is restricted to a few days.

Example 2

Figure 3:
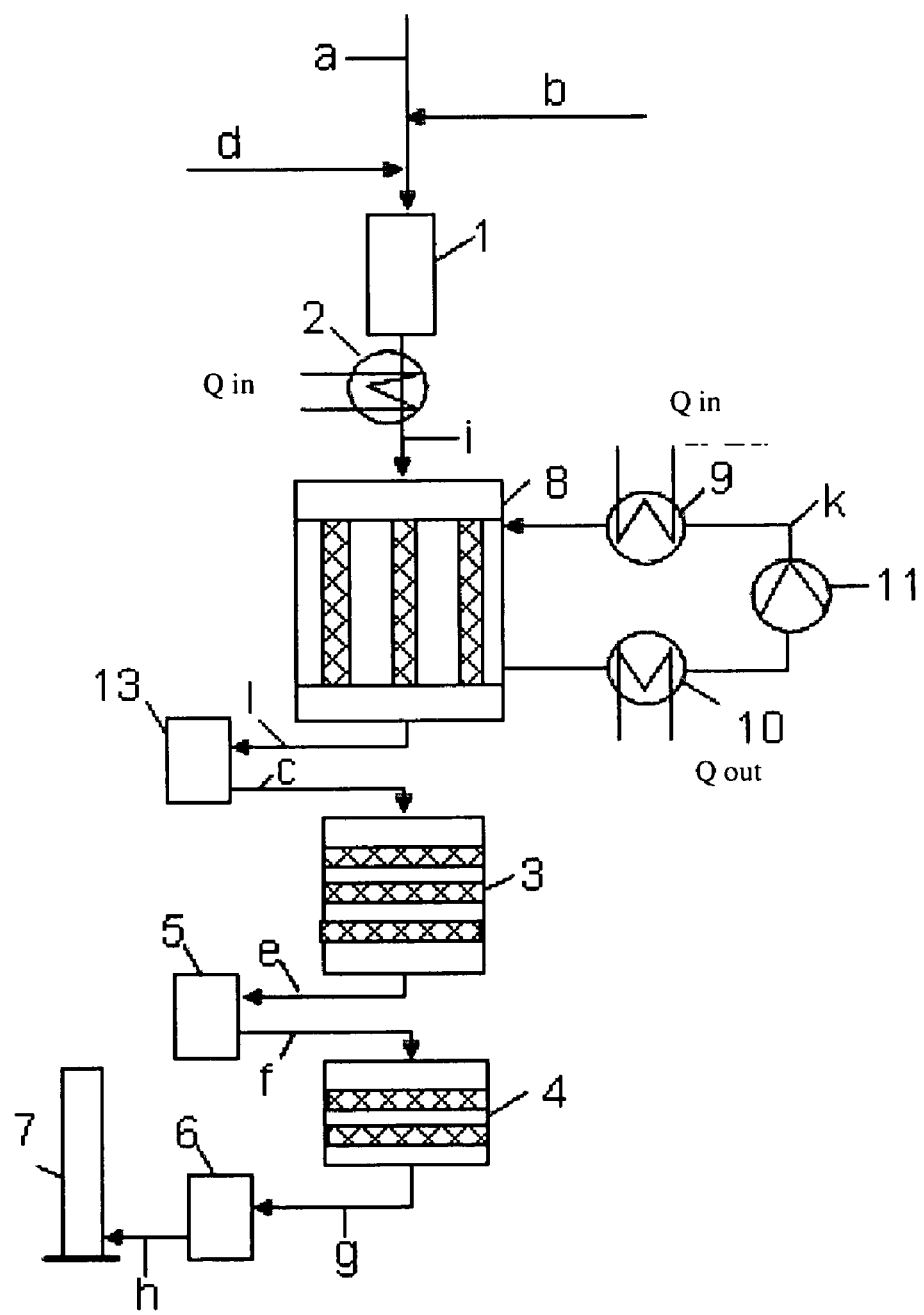
FIG. 3 shows a plant for carrying out the process of the invention in the case of a gas containing much more than 13% by volume of $SO_2$, particularly preferably in the range from 30 to 66% by volume of $SO_2$, comprising a tube contact apparatus, if appropriate with additional air or oxygen, and subsequent preabsorption for subsequent processing of a residual gas containing <13% by volume of $SO_2$ in a main contact plant (Example 2).

FIG. 3 shows, as a difference from the plant described in FIG. 2 for operating the process of the invention, the connection of the tube contact apparatus (PIC) 8 in series. It now additionally comprises a preabsorber 13. The gas from the gas drier 1 is preheated by means of the gas preheater 2 and all fed into the tube contact apparatus (PIC) 8. The choke flap 12 and the bypass line are omitted. This variant has advantages for starting gases having very high $SO_2$ inlet concentrations in the range from 13 to 66% by volume of $SO_2$. The sulphur trioxide formed in the tube contact apparatus (PIC) 8 is absorbed with the proportions of water in the pump circuit of the preabsorber 13 to form sulphuric acid. The gas is subsequently conveyed via line c to the first main contact 3.

In the case of very high sulphur dioxide inlet concentrations, technical-grade oxygen has to be added as described in the case of FIG. 1. For process control, a sulphur dioxide measurement is installed downstream of the tube contact apparatus (PIC) 8 and the intent temperature in the cooling circuit of the tube contact apparatus is set by means of this so that the reaction ensures a sulphur dioxide concentration of from 5% by volume to 13.5% by volume, preferably from 8% by volume to 12% by volume, at the outlet of this apparatus.

Advantages of this variant are, in particular but not exclusively for existing plants, a reduction in the operating costs by increasing the capacity of the upstream production plant at low capital costs and production of larger amounts of sulphuric acid and low-pressure steam. In addition, this embodiment offers, owing to the high $SO_3$ concentration downstream of the tube contact apparatus (PIC) 8 at the inlet to the preabsorber 13, the opportunity of directly producing oleum having a high content (>35%) of free $SO_3$. This is only possible in the case of plants according to the prior art by means of costly additional plants.

Example 3

Figure 4:
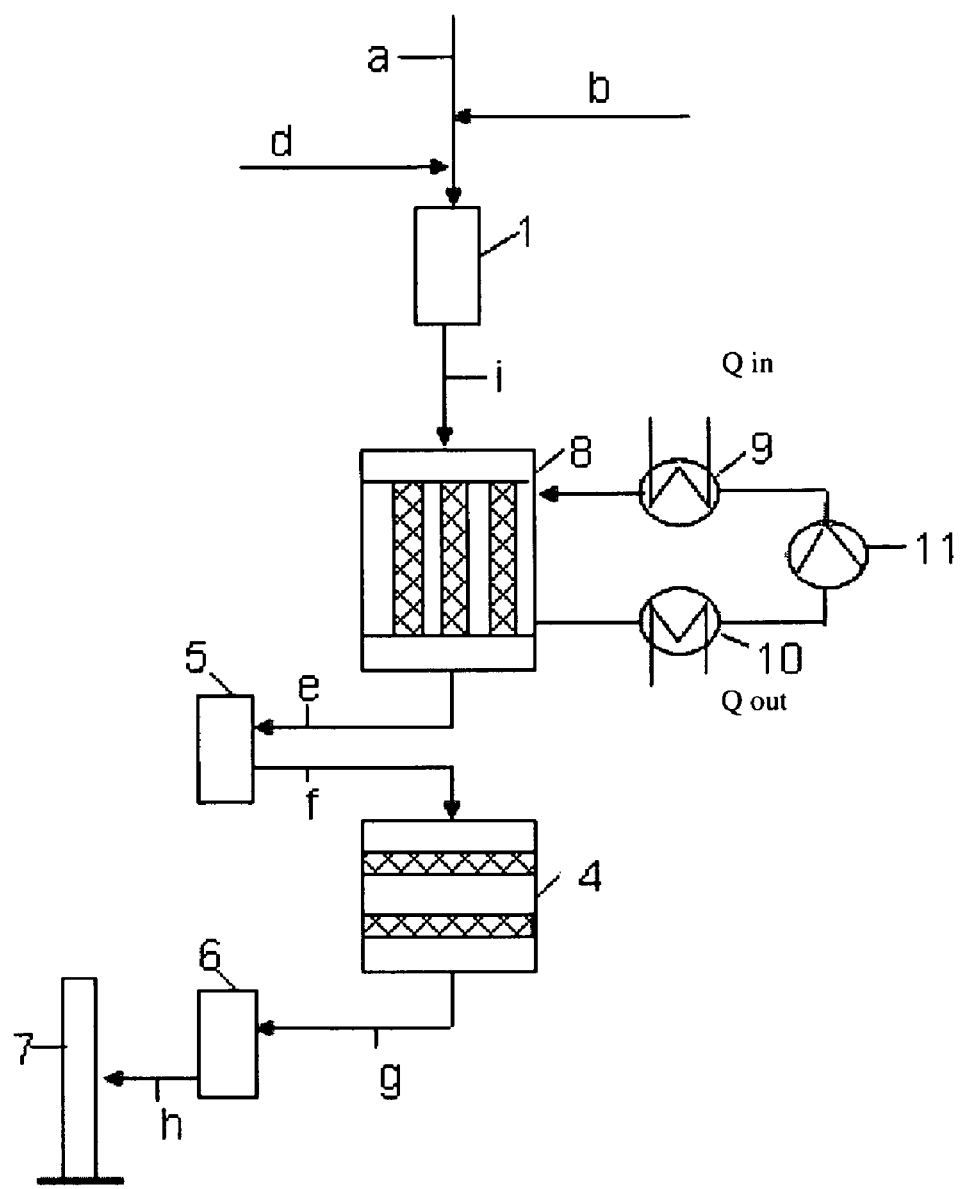
FIG. 4 shows a plant for carrying out the process of the invention, in which a gas containing 5-30% by volume of $SO_2$ is processed by means of a tube contact apparatus, an oleum/intermediate absorber, a main contact and subsequent final absorption and discharged via a stack.

FIG. 4 shows, as a difference from the plant operated by the process of the invention described in Example 2 (FIG. 3), the connection of the tube contact apparatus (PIC) 8 in series without preabsorber 13 and first main contact 3. The gas from the gas drier 1 is, after preheating by means of the gas preheater 2, all fed into the tube contact apparatus (PIC) 8. The gas is subsequently conveyed via gas line e to the oleum/intermediate absorber. Regulation of the sulphur dioxide concentration downstream of the tube contact apparatus (PIC) 8 is carried out as described under Example FIG. 3.

This variant has advantages for starting gases having sulphur dioxide concentrations in the starting gas of from 5 to 30% by volume. Advantages of this variant are the high flexibility in respect of the starting concentration of sulphur dioxide and the low specific operating costs at high inlet concentrations due to relatively low capital costs, high sulphuric acid production and large amounts of reusable thermal energy (e.g. low-pressure steam).

Example 4

Figure 5:
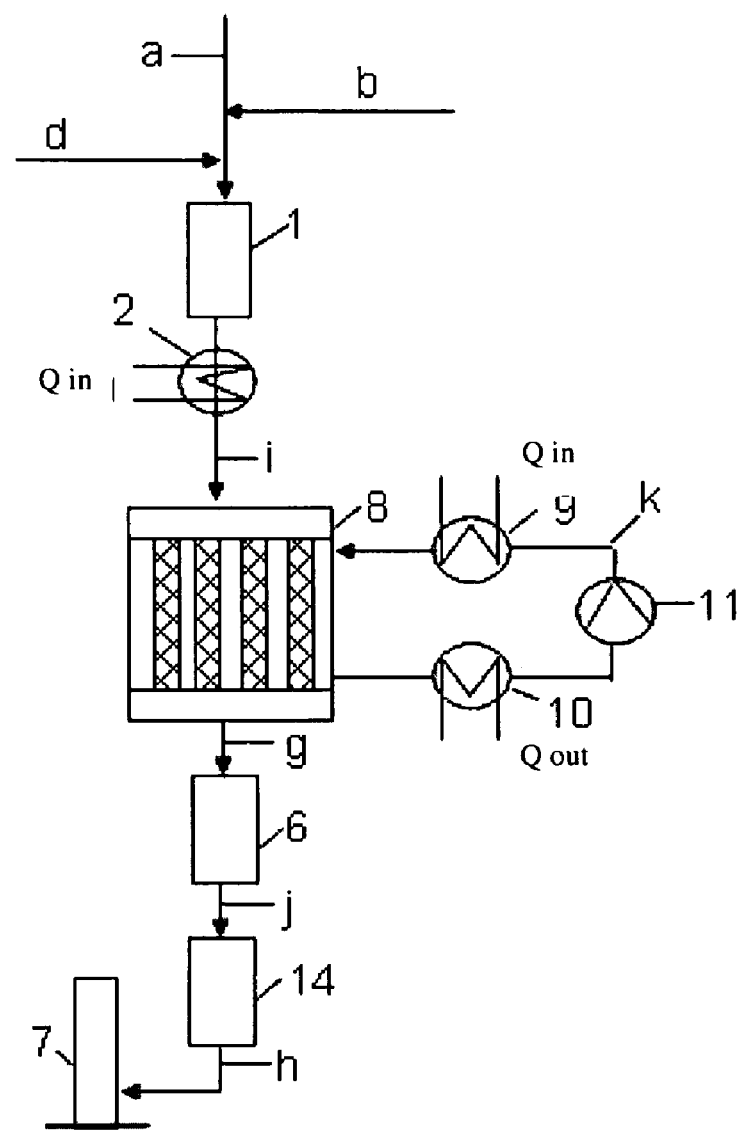
FIG. 5 shows a plant for carrying out the process of the invention, in which a gas containing <5% by volume of $SO_2$ is processed by means of a tube contact apparatus, a final absorber and subsequent scrubber for final purification and discharged via a stack.

FIG. 5 shows, as a difference from the plant operated by the process of the invention described in Example 3 (FIG. 4), the connection of the tube contact apparatus (PIC) 8 in series without oleum/intermediate absorber 5 and second main contact 4. The gas from the gas drier 1 is, after preheating by means of the gas preheater 2, all fed into the tube contact apparatus (PIC) 8. The gas is subsequently conveyed via gas line e to the final absorber 6. The gas subsequently goes via line j to final purification in the gas scrubbing plant 14 before it is discharged into the environment via line h and stack 7.

This variant has advantages particularly for starting gases having sulphur dioxide concentrations in the starting gas of less than 5% by volume. An advantage of this variant is that the process of the invention now makes it possible, even in the case of starting gases having low concentrations of sulphur dioxide, to achieve a high conversion (>90%) in the oxidation to sulphur trioxide using, for example, conventional vanadium pentoxide catalysts with or without caesium, at the same time with high flexibility in respect of the starting concentration of sulphur dioxide. The unreacted proportion of sulphur dioxide is finally purified to the required legal emission limits in a final gas scrubber, e.g. catalytically over wet activated carbon or other customary methods.

Simulations:

It is shown by means of a mathematical simulation model which models, according to the invention, a single tube of the tube contact apparatus with pseudoisothermal process conditions that the desired conversions above 85%, preferably above 92%, can surprisingly be achieved by means of the tube contact apparatus of the invention within the claimed process window for the claimed range of sulphur dioxide contents of 0.1-66% by volume.

The reaction of sulphur dioxide into sulphur trioxide over a $V_2O_5$ catalyst is described by the following simplified kinetic equation:

$$R = \frac{k_{10} \cdot e^{\left(\frac{-E_A}{R \cdot T} + B_0\right)} \cdot p \cdot y_{SO_2}}{(y_{SO_2} + k_2 \cdot y_{SO_3})} \cdot \left(1 - \frac{Q_R}{K_P}\right).$$

Here, $Q_R$ is the reaction quotient and $K_P$ is the equilibrium constant of the reaction. This equation is described, for example, in the following references ("Rate Equations of Solie-Catalyzed Reactions", Edt. Reiji Mezaki, Hakuai Inoue, University Tokyo Press, 1990, pages 1-11). Here, the following values for the individual constants were assumed: $E_A$=92 084 J/mol, $B_0$=15.1 J/mol and $k_2$=0.8. The $V_2O_5$ catalyst on an $SiO_2$ support of the type O4-110 from BASF is used as catalyst. For this catalyst, the value $k_{10}$=1.3E−5 mol/(g of catalyst s bar) was found.

The single tube had an internal diameter of 60.9 mm and a length of 4 m. It is filled with the $V_2O_5$ catalyst mixed with the inert catalyst support material as inert material.

Simulation 1:

In a first simulation, the single tube was filled with a mixture of inert material to catalyst in a ratio of 72.5:27.5 ($m^3$: $m^3$). The outer tube was cooled by means of air having an inlet temperature of 410° C. and an outlet temperature of 435° C. The feed gas comprising sulphur dioxide together with oxygen, nitrogen and carbon dioxide flowed at a pressure of 1.4 bar into the single tube; the specific mass flows were 2.09 g of $N_2$/s/kg of catalyst, 1.06 g of $CO_2$/s/kg of catalyst, 0.31 g of $SO_2$/s/kg of catalyst (4% by volume) and 0.15 g of $O_2$/s/kg of catalyst. The inlet temperature was 420° C., the outlet temperature was 436° C. and the maximum temperature was 469° C. The conversion of sulphur dioxide into sulphur trioxide at the tube outlet was calculated as 99.7%.

Simulation 1a:

In a further first simulation, the single tube was filled with a mixture of inert material to catalyst in a ratio of 82:18 ($m^3$:$m^3$). The outlet tube was cooled by means of air having an inlet temperature of 450° C. The feed gas comprising sulphur dioxide together with oxygen, nitrogen and carbon dioxide flowed at a pressure of 1.2 bar into the single tube; the specific mass flows were 2.10 g of $N_2$/s/kg of catalyst, 1.40 g of $CO_2$/s/kg of catalyst, 1.12 g of $SO_2$/s/kg of catalyst (12.0% by volume) and 0.74 g of $O_2$/s/kg of catalyst. The inlet temperature was 380° C., the outlet temperature was 480° C. and the maximum temperature was 498° C. The conversion of sulphur dioxide into sulphur trioxide at the tube outlet was calculated as 90%.

Simulation 2:

In a second simulation, the single tube was filled with a mixture of inert material to catalyst in a ratio of 72.5:27.5 ($m^3$:$m^3$). The outer tube was cooled by means of air having an inlet temperature of 380° C. and an outlet temperature of 478° C. Sulphur dioxide flowed together with oxygen, nitrogen and carbon dioxide at a pressure of 1.4 bar into the single tube; the specific mass flows were 1.02 g of $N_2$/s/kg of catalyst, 0.85 g of $CO_2$/s/kg of catalyst, 1.24 g of $SO_2$/s/kg of catalyst (20% by volume) and 0.50 g of $O_2$/s/kg of catalyst. The inlet temperature was 400° C., the outlet temperature was 488° C. and the maximum temperature was 575° C. The conversion of sulphur dioxide into sulphur trioxide at the tube outlet was calculated as 98.6%.

Simulation 2a:

In a further second simulation, the single tube was filled with a mixture of inert material to catalyst in a ratio of 64.5.5:35.5.5 ($m^3$:$m^3$). The outer tube was cooled by means of air having an inlet temperature of 440° C. Sulphur dioxide flowed together with oxygen, nitrogen and carbon dioxide at a pressure of 1.30 bar into the single tube; the specific mass flows were 1.82 g of $N_2$/s/kg of catalyst, 1.51 g of $CO_2$/s/kg of catalyst, 1.87 g of $SO_2$/s/kg of catalyst (18% by volume) and 1.05 g of $O_2$/s/kg of catalyst. The inlet temperature was 410° C., the outlet temperature was 545° C. and the maximum temperature was 554° C. The conversion of sulphur dioxide into sulphur trioxide at the tube outlet was calculated as 92%.

Simulation 3:

The single tube was filled with a mixture of inert material to catalyst in a ratio of 60:40 ($m^3$:$m^3$). The outer tube was cooled by means of air (inlet temperature: 350° C., outlet temperature: 428° C.). Sulphur dioxide flowed together with oxygen and nitrogen at a pressure of 1.4 bar into the single tube; the specific mass flows were 0.26 g of $N_2$/s/kg of catalyst, 1.71 g of $SO_2$/s/kg of catalyst (50% by volume) and 0.51 g of $O_2$/s/kg of catalyst. The inlet temperature was 400° C., the outlet temperature was 442° C. and the maximum temperature was 575° C. The conversion of sulphur dioxide into sulphur trioxide at the tube outlet was calculated as 93.0%.

Simulation 3a:

The single tube was filled with a mixture of inert material to catalyst in a ratio of 50:50 ($m^3$:$m^3$). The outer tube was cooled by means of air (inlet temperature: 430° C.). Sulphur dioxide flowed together with oxygen and nitrogen at a pressure of 1.3 bar into the single tube; the specific mass flows were 1.44 g of $N_2$/s/kg of catalyst, 1.81 g of $SO_2$/s/kg of catalyst (25% by volume) and 0.94 g of $O_2$/s/kg of catalyst. The inlet temperature was 380° C., the outlet temperature was 555° C. and the maximum temperature was 557° C. The conversion of sulphur dioxide into sulphur trioxide at the tube outlet was calculated as 82%.

Simulation 4:

The single tube was filled with a mixture of inert material to catalyst in a ratio of 50:50 ($m^3$:$m^3$). The outer tube was cooled by means of air (inlet temperature: 425° C.). Sulphur dioxide flowed together with oxygen and nitrogen at a pressure of 1.38 bar into the single tube; the specific mass flows were 2.02 g of $N_2$/s/kg of catalyst, 1.62 g of $SO_2$/s/kg of catalyst (20% by volume) and 0.94 g of $O_2$/s/kg of catalyst. The inlet temperature was 380° C., the outlet temperature was 551° C. and the maximum temperature was 555° C. The conversion of sulphur dioxide into sulphur trioxide at the tube outlet was calculated as 87%.

Simulation 5:

The boundary conditions corresponded, except for the inlet temperature of the cooling air, to simulation 4. When the inlet temperature of the cooling air was set to 330° C., a calculated outlet concentration of $SO_2$ of 10% was surprisingly obtained. This last simulation shows that the outlet concentration can be controlled by adjustment of the process parameters.

An important result of the numerical simulation is the setting of the construction features of the tube contact apparatus, for example tube diameter, tube length, K value (gap between interior tube and outer tube), the tube-in-tube construction as cocurrent cooler.

Pilot Tests:

The invention will now be described by means of the results from the piloting of a single tube reactor in a bypass arrangement as per FIG. 2 in an existing sulphuric acid plant under real conditions. The results of 4 trials are shown, but these do not constitute a restriction of the process of the invention. For this purpose, a single tube reactor which corresponds in terms of its dimensions and its mode of operation to the single tube of an industrial apparatus having up to several thousand tubes has been developed.

The advantage of this procedure is minimization of the scale-up risk in conversion to the industrial scale.

The key component of the pilot plant was the single tube reactor with its cooling air inlet and outlet housing and the cooled reaction zone configured as a tube-in-tube construction. The central interior reaction tube (here=63.5×2.6 mm) was filled over a height of 4 m with a bed of catalyst. Here, the $SO_2$ present in the process gas reacted to a particular extent to form $SO_3$ with liberation of heat. The tube-in-tube construction was cooled in cocurrent via the tube gap over the total reaction length. $SO_2$ and oxygen could be introduced if required at the gas inlet end. The gas inlet temperature was adjustable.

The gas fed in and cooling air could be adjusted both in terms of amount and also in terms of the inlet temperature. Relevant gas analyses, temperature and pressure measurements were recorded and documented via a central measurement recording unit.

In the pilot test, the following process parameters were examined:

$SO_2$ inlet concentration of 10-25%

Gas volume flows of from 3 to 14 Standard $m^3$/h

Gas inlet temperatures of 360-450° C.

Cooling air inlet temperatures of 350-450° C.
$O_2/SO_2$ ratio of 0.8 to 1.2
Proportion of catalyst in the bed of 18-50%

TABLE 1

|  | Trial 1 | Trial 2 | Trial 3 | Trial 4 |
|---|---|---|---|---|
| Catalyst mixture in the reactor tube (% by volume) |  |  |  |  |
| Standard catalyst | 18 | 27 | 37.5 | 37.5 |
| Caesium catalyst |  | 8.5 | 12.5 | 12.5 |
| Inert bed | 82 | 64.5 | 50 | 50 |
| Gas inlet of reactor |  |  |  |  |
| Volume flow (Standard m³/h) | 5.3 | 12.2 | 11.5 | 12.1 |
| Concentrations: |  |  |  |  |
| $SO_2$ (% by volume) | 11.8 | 18.3 | 25.0 | 20.0 |
| $O_2$ (% by volume) | 15.4 | 20.8 | 26.0 | 18.9 |
| Inlet temperature (° C.) | 382 | 409 | 374 | 380 |
| Maximum temperature[1] (° C.) | 504 | 499 | 532 | 517 |
| Gas outlet of reactor |  |  |  |  |
| Concentrations: |  |  |  |  |
| $SO_2$ (% by volume) | 1.7 | 1.1 | 3.2 | 2.3 |
| $O_2$ (% by volume) | 12.5 | 15.7 | 15.7 | 13.5 |
| Outlet temperature (° C.) | 500 | 491 | 528 | 513 |
| Air cooling |  |  |  |  |
| Volume flow (Standard m³/h) | 40 | 33 | 30 | 30 |
| Inlet temperature (° C.) | 454 | 440 | 426 | 425 |
| Outlet temperature (° C.) | 513 | 506 | 547 | 529 |
| Conversion of $SO_2$ (%) | 85.6 | 94.0 | 87.2 | 88.5 |

4 temperature measurement points were installed 1 m apart over the 4 m long reaction tube. The temperature maximum actually reached between 2 measurement points was up to 50° C. higher.

As shown in Table 1, it could be confirmed in practical use of the process of the invention that specifically significantly more sulphuric acid can be produced compared to the prior art at $SO_2$ inlet concentrations significantly higher than in the prior art, a high $SO_2$ conversion in one stage and good regulation behaviour of the plant. The maximum permissible temperature over the catalyst could in all cases be set reliably by setting of the cooling power and the inlet temperature of the cooling air. The results of the simulation were confirmed with sufficient accuracy.

The invention claimed is:

1. Process for the continuous catalytic, complete or partial oxidation of a starting gas containing sulphur dioxide and oxygen in a contact apparatus, the contact apparatus being an upright heat exchanger comprising at least a plurality of double-walled tubes which have an interior tube and an outer tube, with a catalyst being present in the interior tubes and heat transfer being effected around these interior tubes by means of a cooling medium which is conveyed in cocurrent through the intermediate space between interior and outer tubes in order to establish a temperature profile over the length of the reaction tube, at which the catalyst is kept active.

2. Process according to claim 1, wherein the reactivity of the catalyst used is preset by mixing with the inert material in a ratio of from 1:100 to 100:1.

3. Process according to claim 1 wherein the starting gas has a sulphur dioxide content of from 0.1 to 66% by volume.

4. Process according to claim 1, wherein air and/or technical-grade oxygen is introduced into the starting gas in an amount sufficient to form a volume ratio of $O_2$ to $SO_2$ in the gas of from 0.5 to 1.2.

5. Process according claim 1, wherein the introduction or removal of energy to or from the reaction tubes is operated in cocurrent using a heat-transfer medium.

6. Process according to claim 1, wherein the removal of energy is effected by air and a heat transfer number of from 20 to 80 W/m²K between interior tube and cooling medium is set.

7. Process according to claim 1, wherein the starting gas having an $SO_2$ concentration of more than 13% is divided into two substreams, one of the substreams being fed through the contact apparatus and recombined with the other substream, and the substreams are divided in such a way, that the $SO_2$ concentration in the recombined substreams is less than 13%, and the recombined substreams are fed to at least one main contact in order to convert at least part of the remaining $SO_2$ to $SO_3$.

8. Process according to claim 1 wherein, in a first step the starting gas having an $SO_2$ concentration of more than 13% is fed through the contact apparatus in order to convert part of the $SO_2$ to $SO_3$, and in a second step the gas leaving the contact apparatus, after optionally being fed through a preasorber for removing $SO_3$, is fed to a main contact in order to convert at least part of the remaining $SO_2$ to $SO_3$.

9. Apparatus for the continuous catalytic complete or partial oxidation of a starting gas containing 0.1% to 66% sulphur dioxide and oxygen, having at least one tube contact apparatus which is an upright heat exchanger comprising at least one double-walled tube whose catalyst-filled interior tube forms a reaction tube, and is capable of transferring heat from as well as to the reaction tube by means of a cooling/heating medium.

10. Apparatus according to claim 9, wherein the reaction tubes have a nominal diameter of from 25 mm to 150 mm at a tube length of from 1 m to 12 m.

11. Apparatus according to claim 9 or 10, wherein the catalyst is mixed with inert material to optimize the removal of energy.

12. Apparatus according to claim 9, wherein the heat is transferred around the reaction tubes by means of air as cooling medium and the double-walled construction enables a heat transfer number of from 20 to 80 W/m²K between interior tube and cooling medium.

13. Apparatus according to claim 9, wherein the tube contact apparatus is followed by:
  a. optionally a preabsorber,
  b. one or more contact stages, optionally with one or more oleum/intermediate absorbers,
  c. a final absorber, optionally an offgas purification plant.

14. Apparatus according to claim 9, wherein the apparatus is installed in a bypass arrangement upstream of a conventional double contact plant, so that the starting gas can be divided by a choke flap into two substreams, one of the substreams can be fed through the apparatus and recombined with the other substream, and the recombined substreams can be fed to a main contact.

15. Apparatus according to claim 9, wherein the apparatus comprises at least 100 tubes.

16. Apparatus according to claim 15 wherein the apparatus comprises more than 1000 tubes.

* * * * *